United States Patent [19]

Burbeck et al.

[11] 4,276,497
[45] Jun. 30, 1981

[54] LASER FLASHTUBE POWER SUPPLY

[75] Inventors: Ronald N. Burbeck; Michael R. Keightley, both of Rugby, England

[73] Assignee: J. K. Lasers Limited, Rugby, England

[21] Appl. No.: 33,399

[22] Filed: Apr. 26, 1979

[30] Foreign Application Priority Data

Apr. 28, 1978 [GB] United Kingdom ............... 16879/78

[51] Int. Cl.³ ............................................. H05B 41/34
[52] U.S. Cl. .............................. 315/209 R; 315/172; 315/208; 315/244; 315/291; 331/94.5 PE
[58] Field of Search ............... 315/200 A, 208, 241 R, 315/243, 176, 172, 209 R, 240, 244, 287, 291, DIG. 7; 331/94.5 PE

[56] References Cited

U.S. PATENT DOCUMENTS

| 3,430,159 | 2/1969 | Roeber | 315/241 R X |
| 3,591,830 | 7/1971 | Woolsey | 315/241 R |
| 4,069,442 | 1/1978 | Soileau | 315/208 |
| 4,132,925 | 1/1979 | Schmutzer et al. | 315/208 |

FOREIGN PATENT DOCUMENTS 1119431  7/1968  United Kingdom.
1303113  1/1973  United Kingdom.

Primary Examiner—Eugene R. LaRoche
Attorney, Agent, or Firm—Watson, Cole, Grindle & Watson

[57] ABSTRACT

Power supply means for a laser flashtube or similar lamp (such as a continuous wave arc lamp) consists of high frequency switch means for providing a pulse train output from a direct current supply with provision for modulating the pulse width of said output and a filter which receives the modulated pulse train output for substantially removing high frequency ripple therefrom prior to passage of the resulting pulse train output to the flashtube or similar lamp. For supplying a simmer current to the flashtube or lamp the modulated pulse train output may be raised to a DC level for this purpose. The high frequency switch means may consist of at least one transistor or thyristor and the filter may consist of an inductor/capacitor arrangement.

8 Claims, 8 Drawing Figures

LASER FLASHTUBE POWER SUPPLY

BACKGROUND OF THE INVENTION

1. Field of the Invention

This invention relates to power supply means for driving flashtubes or lamps as used for optically pumping pulsed lasers.

2. Prior Art

Driving flashtubes with pulses in excess of about two milliseconds (2 ms) is difficult and hitherto has entailed the use of multiple section capacitor inductor networks in a similar manner to that used in conventional radar pulse modulators. Because the impedance of a conducting flashtube is very low, the capacitor inductor network is bulky and expensive, especially for long duration pulses. Moreover because the capacitors are charged to a high voltage (approximately twice the lamp operating voltage) varying the pulse length by tap changing is difficult. Such an arrangement is, therefore, very inflexible. Furthermore, in some laser applications there is also a requirement to carefully control the profile of the pumping pulse. This is difficult, if not impossible, to achieve with any degree of flexibility with a capacitor inductor network.

SUMMARY OF THE INVENTION

The object of this invention is to overcome the limitations of the above mentioned capacitor inductor network and in particular to provide simple, compact and relatively inexpensive power supply means and method of operation thereof for driving a flashtube or a pair of such tubes and having a high degree of flexibility as regards variation in pulse duration and form in the current applied to the flashtube. These and other practical advantages will be apparent from the following disclosure.

According to this invention laser flashtube or similar lamp power supply means comprises high frequency electronic means for providing a high frequency pulse train output and means for modulating the pulse width of said output for passage of a resulting pulse train output to a flashtube or similar lamp.

The invention thus includes provision for pulse width modulation of the high frequency pulses in the pulse train output for obtaining a desired profile of pulse output to the flashtube, or for similarly obtaining continuous modulation of a continuous wave (cw) arc lamp of the type used for driving some YAG laser systems.

BRIEF DESCRIPTION OF THE DRAWINGS

In practice the procedure is as follows, reference being had to the accompanying drawings in which:

Referring to FIG. 1 the or each flashtube F can be repetitively triggered or is preferably kept simmering at a low level continuously. Thus in practice the simmer mode would be used in the vast majority of cases as the current rise time into the flashtube would be excessive for most applications using a repetitively triggered arrangement. The simmer current supply is indicated as SM and the flashtube starter as ST.

As shown in FIG. 1, the input of the circuit receives a suitable primary direct current (DC) supply which can be conveniently provided by a rectified current from the usual mains supply. A high frequency switch S1 which may be a transistor or thyristor (or two or more thereof) converts the primary DC supply into a high frequency pulse train, the duty cycle of which, and hence its average value, is adjustable. The duty cycle is readily adjustable by conventional means CM, e.g. in which a variable low level DC voltage is compared with a sawtooth waveform operating at the required high frequency switching speed and the output applied to control transistor switch SW1. Typically the low level DC voltage is variable between 0 to 10 volts. An inductor and capacitor arrangement LC forms a filter to substantially remove the high frequency ripple and present essentially a continuous DC voltage at the output across the capacitor C to the flashtube F.

For a pulsed operating mode in the above manner, the pulses due to the high frequency switch S1 are thus modulated to give a desired pulse profile into the flashtube F and the filter LC is arranged to pass the resulting pulses and to filter the high frequency ripple.

When the above mentioned low level voltage is at zero or in some cases at a maximum, the pulses of the pulse train are of zero width, i.e. where intervals are required between pulse trains in determining the appropriate duration of each pulse train and of the resulting pulses to the flashtube F. This affords considerable scope in controlling the form and duration, or width of each resulting pulse to flashtube F.

Figure 2:
FIGS. 2 to 8 are diagrams indicating pulse and related formations.
Figure 3:
Figure 4:

The wave form of the pulse train output from the high frequency switch S1 is indicated in FIG. 2 and the resulting pulse profile form is shown in FIG. 3, i.e. as the output from the filter LC. Thus a typical duration, form and also frequency of the resulting pulses will be apparent from FIG. 3 and which then pass to the flashtube F. The corresponding current to the flashtube F is indicated in FIG. 4.

Figure 5:
Figure 6:

However, the duration and frequency of the pulses can be varied as above described and according to requirements and also their form profile shaped to suit particular requirements as indicated in FIGS. 5 & 6. Furthermore the duty cycle of the high frequency pulse-train can be varied both on an pulse to-pulse output basis to the flashtube F, or during a flashtube pulse, thus varying both pulse amplitude and pulse shape. As a result the rise and fall times of the pulse and the slope of the top of the pulse can be readily adjusted.

Figure 1:
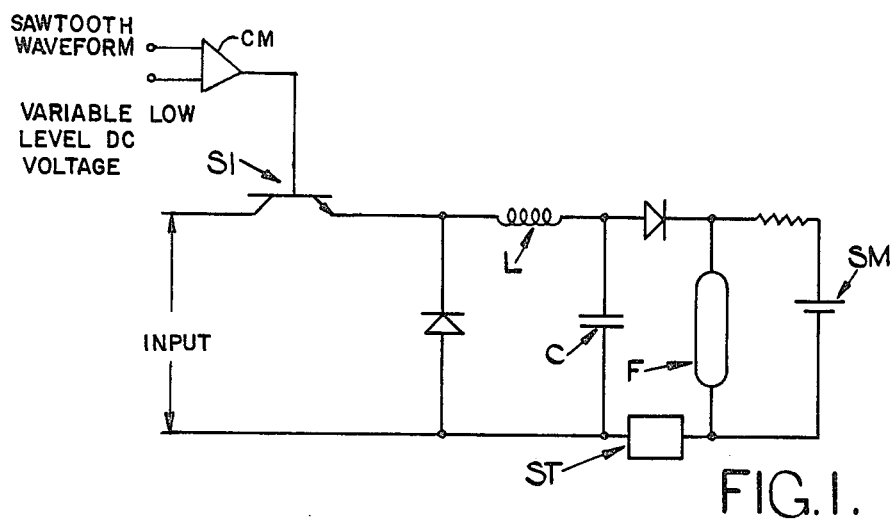
FIG. 1 is a circuit diagram of the power supply means to a flashtube.
Figure 7:
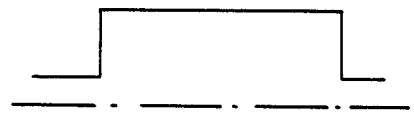

The power supply means according to this invention also enables the chopping system to be employed for supplying a low level continuous simmer current to the flashtube F so that the need for a second DC supply to the latter is obviated. This can be achieved either by raising the DC level of resulting pulses to flash tube F as indicated in FIG. 7 or by operating a high frequency switch in parallel with switch S1 of FIG. 1 operating continuously rather than being modulated with the pulse envelope.

The power supply means in accordance with this invention has particular, but not exclusive, practical application in driving flashtubes of lasers intended for laser machining applications including welding, soldering and like operations and also to certain medical applications such as the coagulation of gastro-intestinal ulcers.

As will be apparent from the foregoing the power supply means enables pulses of longer duration, (e.g. from 1 millisecond to one second) to be obtained than is practical with the conventional capacitor inductor network system and which is particularly desirable in the above mentioned applications, especially in the case of welding or soldering as well as in medical applications. As will also be apparent the laser pumping pulse profile can be readily optimised for a particular application.

Furthermore, the pumping pulse profile can be changed between pulses by computer or micro processor control inputs, allowing, for example, different welds to be made on the same workpiece. This is particularly applicable to overall computer control of a series of welding operations or the like.

It is believed that a laser system employing the power supply means according to this invention will be more efficient due to (a) the elimination of the inherently low efficiency of a capacitor charging power supply system, and (b) the elimination of losses inherent in a capacitor inductor network and also the provision of ideal flashtube driving pulses at all operating voltages. (A capacitor inductor network system can only be matched to the flashtube over a narrow range of operating voltage).

Figure 8:

A still further advantage of the present power supply means is that the flashtube simmer current can be "ramped up" immediately prior to the main pulse, i.e. as indicated in FIG. 8. This results in faster light pulse rise times and is also in the interests of a longer serviceable life of the flashtube.

The power supply could also be used with advantage for direct modulation of continuously operating lasers pumped by c.w. arc lamps, since the pulse modulation described is merely a special case of this more general capability which is self apparent from the foregoing description.

We claim:

1. Power supply means for pulsed operation of a laser flash tube, comprising:
    high frequency switch means for providing a high frequency pulse train output;
    means for controlling said high frequency switch means to modulate the duty cycle of said pulse train output; and
    a filter for substantially removing the high frequency components from said pulse train output.

2. Power supply means as claimed in claim 1 further comprising a variable low level DC voltage control signal and wherein said means for controlling compares a sawtooth waveform with said control signal.

3. Power supply means as in claim 2 wherein the frequency of the pulses in said pulse train output corresponds to the frequency of said sawtooth waveform and the duration of the pulses in said pulse train output corresponds to said variable level DC voltage control signal.

4. Power supply means as claimed in claim 1 further comprising means for raising the DC level of the filtered pulse train output to the flash tube.

5. Power supply means as claimed in claim 1 wherein said filter comprises an inductor and capacitor.

6. A method for generating power supply pulses to a laser flash tube, comprising the steps of:
    generating a high frequency pulse train output;
    means for modulating the duty cycle of said pulse train output; and
    filtering said high frequency pulse train output to substantially remove the high frequency components therefrom.

7. The method as in claim 6 further comprising the step of raising the level of the filtered pulse train output to provide a low level continuous simmer current to the flash tube.

8. The method for generating power supply pulses as in claim 6 further comprising the step of generating a control signal to modulate the duty cycle of said pulse train output by comparing a variable low level DC voltage with a sawtooth waveform.

* * * * *